United States Patent [19]
Hedrick

[11] Patent Number: 5,390,943
[45] Date of Patent: Feb. 21, 1995

[54] HAND BRAKE DEVICE FOR HANDTRUCK

[76] Inventor: Hal T. Hedrick, Rte. 1 Box 6429, Conover, N.C. 28613

[21] Appl. No.: 144,763

[22] Filed: Oct. 28, 1993

[51] Int. Cl.[6] .................................................. B60T 1/00
[52] U.S. Cl. .................................. 280/47.24; 188/22; 188/77 R; 74/471 R; 74/501.6
[58] Field of Search ...................... 188/19, 22, 21, 2 D, 188/77 R, 77 W; 280/47.24, 47.29; 180/19.3; 74/471 R, 501.6

[56] References Cited

U.S. PATENT DOCUMENTS

| | | | |
|---|---|---|---|
| 1,701,188 | 2/1929 | Miller | 188/22 |
| 3,276,550 | 10/1966 | Honeyman | 188/29 |
| 3,422,930 | 1/1969 | Barron | 188/22 |
| 3,486,587 | 12/1969 | Malloy | 188/22 |
| 4,058,189 | 11/1977 | Chamberlain et al. | 188/77 R |
| 4,591,027 | 5/1986 | Takamiya et al. | 188/77 R |
| 4,644,816 | 2/1987 | Cockburn | 74/471 R |
| 4,819,767 | 4/1989 | Laird | 188/2 D |
| 5,277,436 | 1/1994 | Frank et al. | 188/31 |

*Primary Examiner*—Robert J. Oberleitner
*Assistant Examiner*—Lee W. Young

[57] ABSTRACT

A hand brake apparatus for installation on handtrucks of the type which have a load bearing platform and vertical load supporting frame with at least two fixed parallel wheels. An embodiment of the invention includes a single brake actuating lever which operates the two brake mechanisms simultaneously. The brake mechanisms include a band type brake shoe which acts upon a cylindrical brake drum attached to the hub of each wheel. The brake mechanisms are operated by force applied to one compression cable which extends from the brake actuating handle to a brake actuating lever.

1 Claim, 5 Drawing Sheets

HAND BRAKE DEVICE FOR HANDTRUCK

BACKGROUND OF THE INVENTION

1. Field of the Invention

The present invention relates to means for providing braking and improved control to handtrucks of the type common in the art. Handtrucks, generally are two-wheeled conveyances consisting of a lower platform, two wheels attached in parallel at the rear edge of the platform, and an upper portion which extends into a handle. These devices are used for transporting both bulky and heavy items. Often, it is necessary to carry such items up and down stairs, ramps, or other inclines. At these times, it is convenient and safer to apply braking force to the wheels. Since the operator is guiding, supporting, balancing and propelling the handtruck, he or she needs to keep both hands on the handle or handtruck device. Several solutions to the problem of applying braking forces to the wheels have been suggested. The present invention provides a simple, light-weight and inexpensive means which improves on existing devices.

2. Brief Description of the Prior Art

U.S. Pat. No. 3,276,550 to Honeyman, discloses a handtruck with a band-type brake shoe applied to each wheel, and operated by a metal rod connected to an actuating handle attached to one side of the handtruck. The present device discloses an actuating handle disposed in the center of the handtruck, where it can be operated by either hand, allowing greater flexibility in guiding the handtruck. In addition, the present invention is actuated by cables, rather than rods, which are less susceptible to damage, lighter, and are commonly available from motorcycle, automobile, bicycle and other part supply sources, allowing inexpensive maintenance and replacement.

U.S. Pat. No. 3,486,587 to Malloy, discloses a handtruck with brakes provided to each wheel and operated by an actuating lever. These mechanisms are an integral part of the handtruck, and must be included in the manufacturing process. The present invention can be retrofitted to existing handtrucks, and all parts necessary may be provided separate from the handtruck device itself. The Malloy patent discloses brake shoes which operate on the tire of the handtruck wheel, which is less effective and less versatile than the present invention, which operates on drums attached to each wheel hub.

U.S. Pat. No. 3,422,930 to Barron discloses a similar handtruck with separate brakes actuated by a chain acting on a rod connected to both brakes. This device is difficult to adjust for each independent wheel, and can lead to differential braking with dangerous consequences to the operator.

U.S. Pat. No. 4,819,767 to Laird discloses a braking system which, like the present invention can be retrofitted to existing handtrucks. Laird uses a complex system of springs and actuating rods to operate on each independent brake, which is more complex and consequently more expensive than the present invention.

SUMMARY OF THE INVENTION

I have developed and invented a new and improved handtruck having hand brake apparatus which will permit the operator to apply modulated braking force equally to both wheels while retaining the ability to steer and propel the handtruck safely and easily using either hand on the handtruck handle and brake lever.

The present invention consists of a brake actuating handle installed in relationship to the centrally located gripping handle of an existing handtruck, connected to a brake actuating lever by a compression cable, including an adjustment means, leading to a band-type brake operating on each independent wheel of the handtruck. The brake band tightens around a brake drum, mounted axially around the center of the hub of each wheel, thereby applying braking force. A connecting bar extends parallel to the axle of the handtruck, providing support for the fixed end of the brake band. Each adjustment means consists of an adjustment screw, through which the actuating cable passes and which serves as a stop for the rigid outer casing of the screw. Application of force to the brake handle actuating lever causes each independent brake actuating cable to pull a brake actuating lever. The actuating lever operates in opposition to a release spring on each side of the handtruck frame, which is so disposed as to keep the brake bands open when the brake actuating handle is not compressed. The amount of force applied to the brake band is adjusted by the brake adjusting screw, each independent of the other, so that it is simple and convenient to equalize the stopping force applied to each wheel. This is an advantage of this invention over others previously described.

DETAILED DESCRIPTION OF THE INVENTION

Many variations and modifications of the embodiments of the invention will be apparent to those skilled in the art without departing from the scope of the invention, which is defined in the claims appended hereto.

Figure 1:
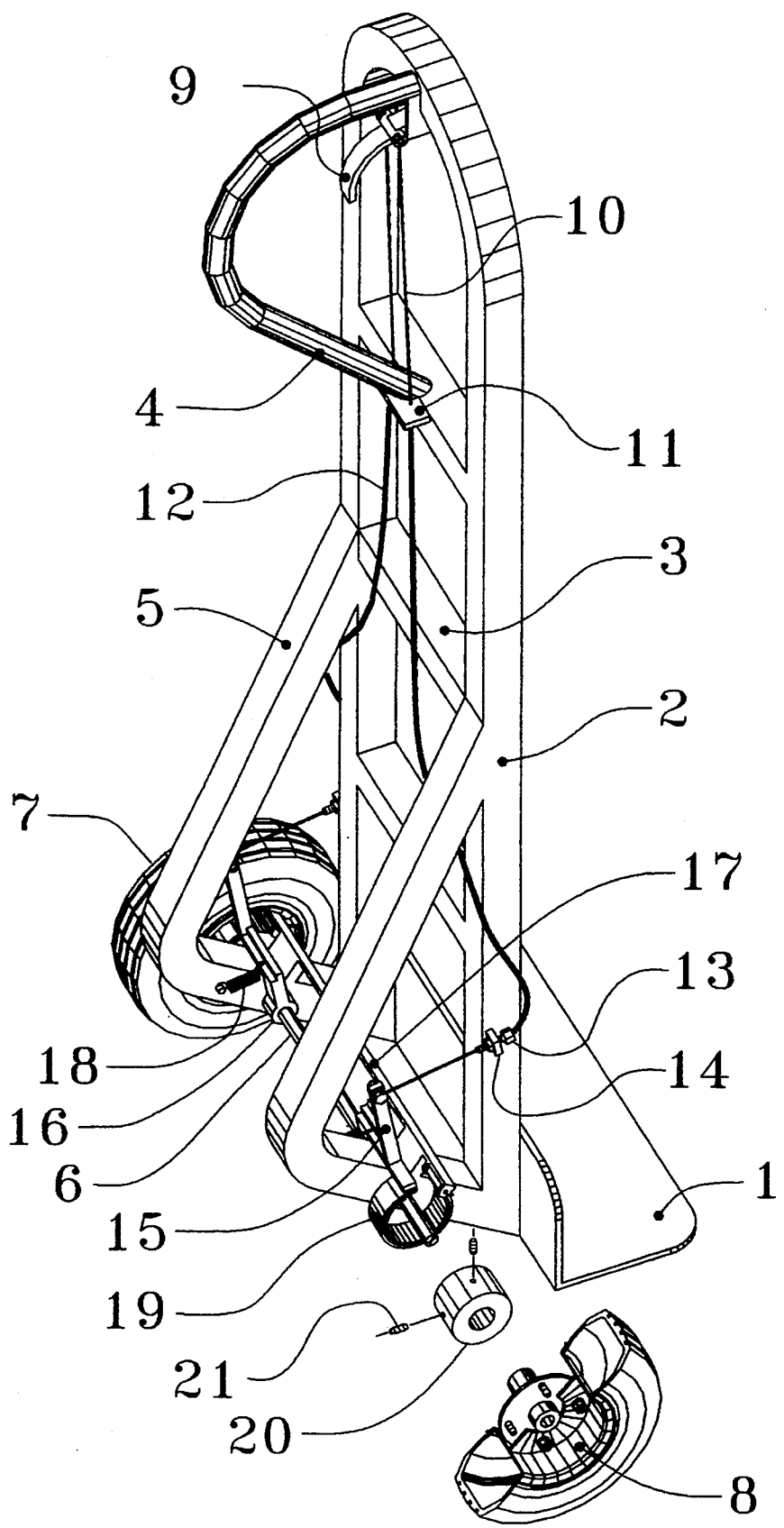
FIG. 1 is a pictorial representation of a preferred embodiment of the invention in perspective view, showing the component parts of the invention.

Referring now to the figures, FIG. 1 shows a perspective view of the invention with the claimed braking system device installed on a handtruck of a type common in the art. Such a handtruck consists of a lower load carrying platform 1, vertical load supporting side rails 2, cross support frame members 3, handle 4, axle support frame members 5, axle 6, wheels 7, and wheel hubs 8. The braking system includes brake actuating handle 9, brake actuating cables 10, outer casing stop 11, outer casing 12, adjusting screws 13, adjusting screw support brackets 14, brake actuating levers 15, brake actuating lever pivot 16, brake connecting bar 17, brake release springs 18, brake bands 19, brake drum 20, and brake drum set screws 21.

Figure 2:
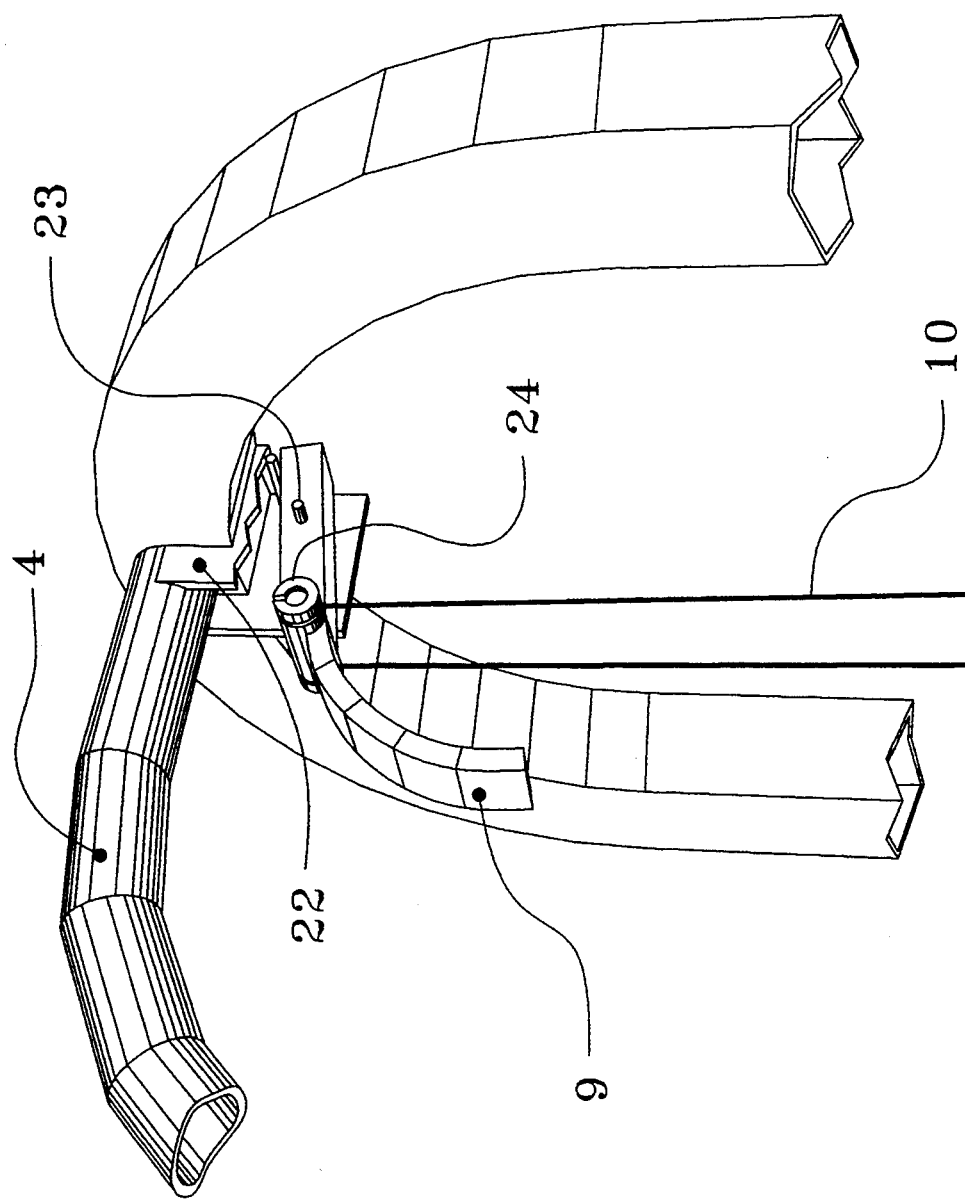
FIG. 2 is a pictorial representation of a portion of a preferred embodiment of the invention in perspective view, showing the brake actuating handle and cables.

FIG. 2 shows a view of the brake actuating handle 9, with a cutaway view of the attachment bracket 22, the brake actuating handle lever 9, brake actuating handle lever pivot 23, brake cables 10, brake cable end receiving slot 24.

Figure 3:
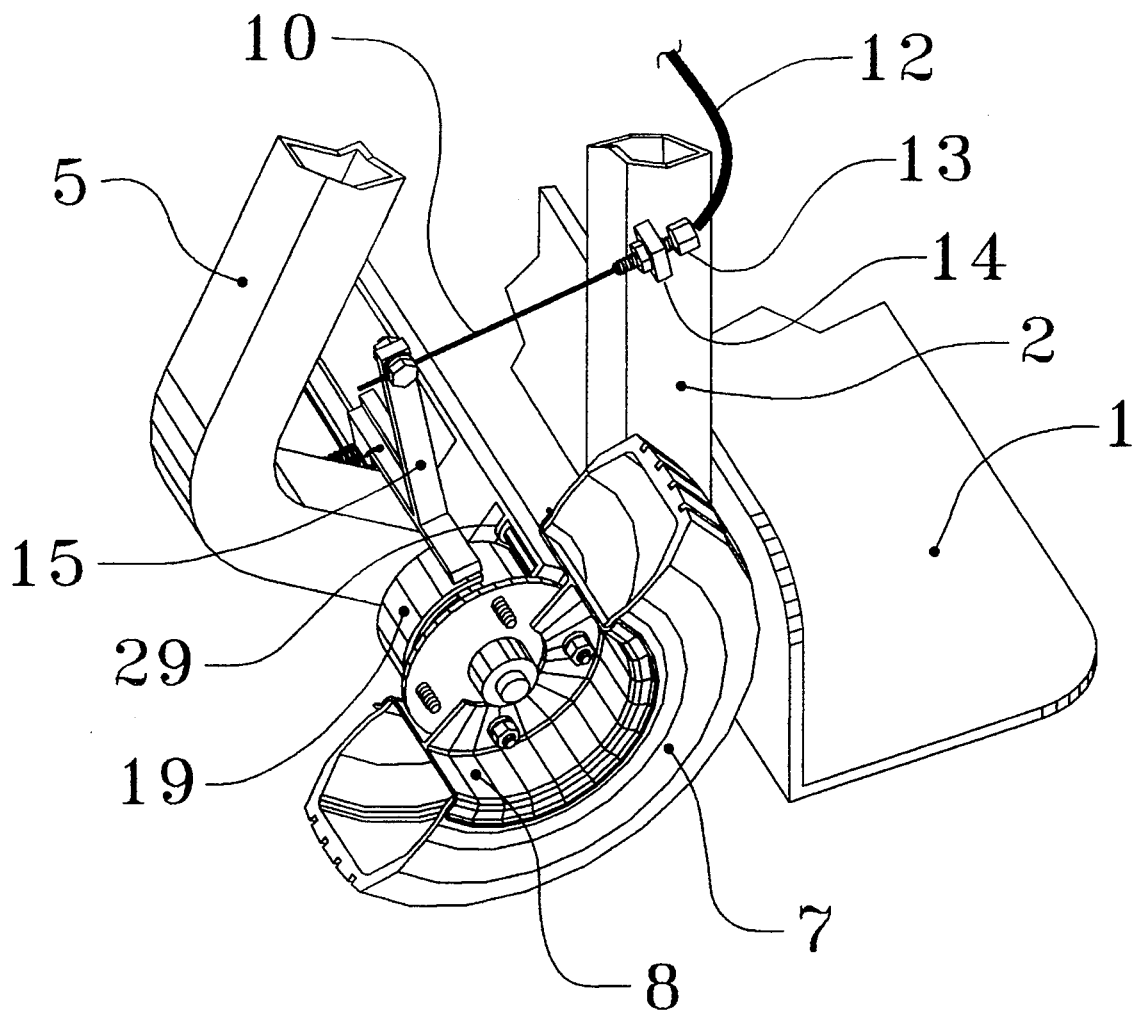
FIG. 3 is a pictorial representation of a portion of a preferred embodiment of the invention in perspective view, showing one wheel of the brake band and actuating lever at one wheel of the handtruck.

FIG. 3 depicts one of the brake mechanisms. One of the two brake cable adjusting screws 13 is depicted attached to side rail 2 by adjusting screw support bracket 14. Brake actuating cable 10 is shown continuing through brake cable adjusting screw 13 to brake actuating lever 15, where it is attached by brake cable end clamp 25. Brake actuating lever 15 is rotatably mounted to axle 6 by brake actuating lever pivot 16 located in brake actuating arm 26. Brake connecting bar 17 is mounted to axle support frame members 5. Brake release spring 18 is attached to axle support frame member 5 at brake release locating stud 27, and the opposing end of brake release spring 18 is attached to brake actuating arm 26 by spring receiving slot 28.

Figure 4:
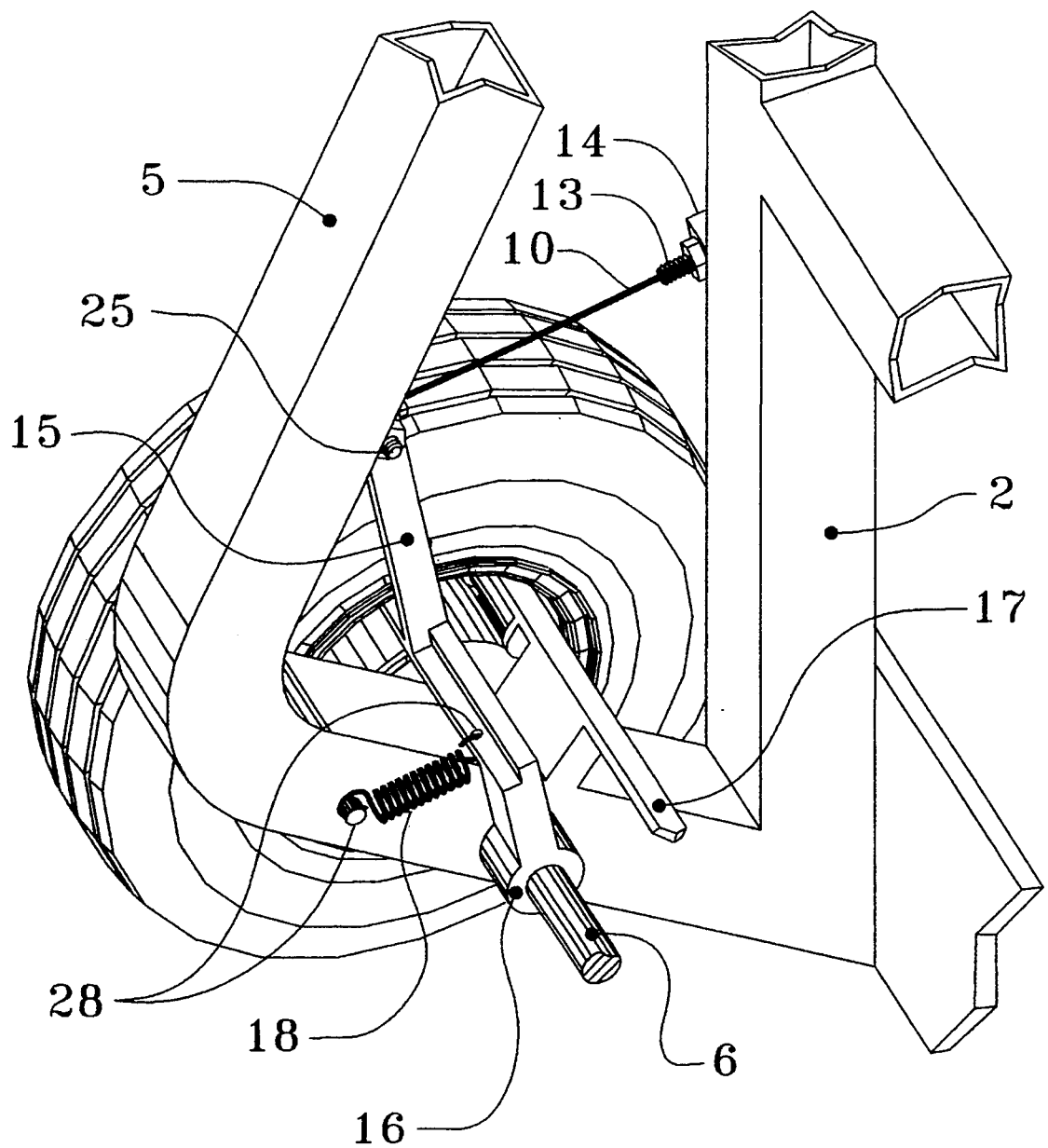
FIG. 4 is a cutaway drawing of one brake mechanism, including portions of the wheel, frame, and actuating mechanism, in addition to the brake drum and band.

FIG. 4 is a cut away view of the brake mechanism. One of the two brake cable adjusting screws 13 is depicted attached to side rail 2 by adjusting screw support bracket 14. Brake actuating cable 10 is shown continuing through brake cable adjusting screw 13 to brake actuating lever 15, where it is attached by brake cable end clamp 25. Each brake actuating cable 10 can be independently adjusted by brake adjusting screw 13 to allow even braking. Brake actuating lever 15 connects with brake connecting bar 17 by brake actuating arm 26. Brake release spring 18 is attached to brake actuating arm 26 by spring receiving slot 28. When pressure is released on brake handle actuating lever 9 brake release spring 18 moves brake actuating lever 15 opening brake band 19 and removing braking force. Brake actuating arm 26 is connected to brake band 19 which is attached at the other end to brake connecting bar 17 at bar attachment point 29. Brake drum 20 is attached to wheel hub 8 at axle 6.

Figure 5:
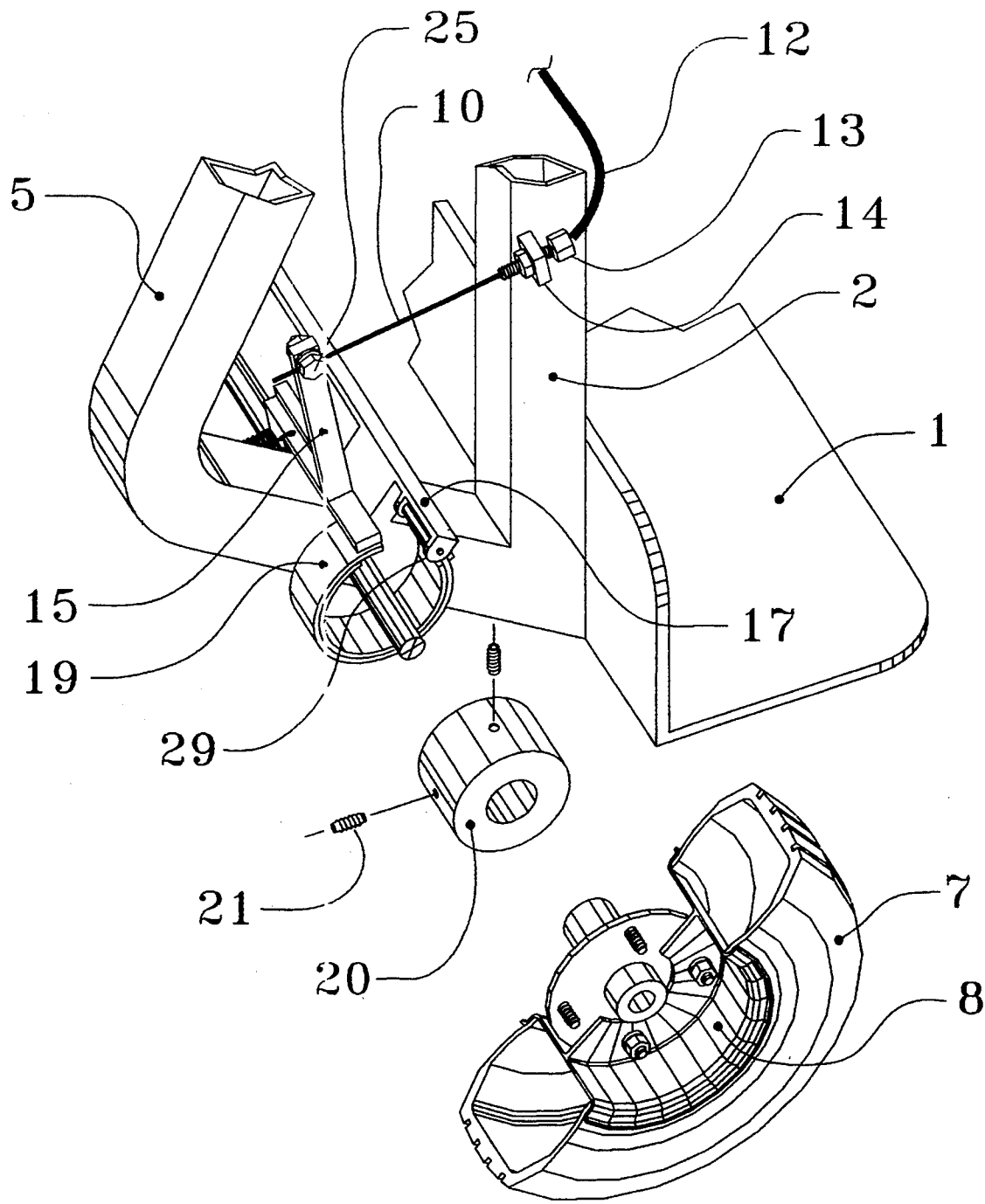
FIG. 5 is an exploded view of one wheel and brake mechanism.

FIG. 5 is an exploded view showing the component parts of this embodiment of the invention. Brake actuating cable 10 runs through adjusting screw 13 and adjusting screw bracket 14 to brake cable end clamp 25 on brake actuating lever 15. Brake band 19 operates on brake drum 20, which is connected to wheel hub 7 by tightening set screws 21. Wheel hub 7 holds wheel 8 to axle 6, in the manner common in the art.

The embodiments described above are merely descriptive of its principles and are not to limit the scope of the invention set out in the following claims.

What is claimed is:

1. In a handtruck common in the art of the type consisting of two parallel wheels on a common axle, a vertical frame with a centrally-located handle device on the upper portion thereof, and a platform disposed approximately parallel to the ground surface and approximately perpendicular to said vertical frame, a brake device comprising a brake actuating handle mounted by a pivot to a bracket on the centrally located handle of a handtruck, two brake actuating cables fixed in two brake cable receiving slots rigidly mounted to said brake actuating lever, each of said brake actuating cables being independent of each other at all points except attachment at said brake cable receiving slots, and each of said brake actuating cables slidably operating within a rigid outer casing, said rigid outer casing terminating at a brake adjusting screw mounted to the vertical frame of said handtruck by an adjusting screw support bracket, said brake actuating cable continuing through said adjusting screw to a brake cable end clamp attached to the end of a brake actuating lever, the other end of said brake actuating lever being rotatably attached to the axle of the handtruck, rotation of said brake actuating lever being opposed by a brake release spring, one end of said brake release spring being attached to the axle support frame member of said handtruck, the other end of said brake release spring being attached to said brake actuating lever; said brake actuating lever being attached at a lower point to an end of a flexible brake band, the other end of said flexible brake band being rigidly attached to a brake connecting bar, said flexible brake band being disposed circularly about a brake drum, which is immovably attached by set screws to a wheel hub, which is connected to a wheel.

* * * * *